(12) United States Patent
Kahra et al.

(10) Patent No.: US 9,777,842 B2
(45) Date of Patent: Oct. 3, 2017

(54) SEAL OF TOOL AND METHOD OF SEALING

(71) Applicant: SANDVIK MINING AND CONSTRUCTION OY, Tampere (FI)

(72) Inventors: Ossi Kahra, Tampere (FI); Jyrki Nissinen, Tampere (FI)

(73) Assignee: SANDVIK MINING AND CONSTRUCTION OY, Tampere, FL (US)

( * ) Notice: Subject to any disclaimer, the term of this patent is extended or adjusted under 35 U.S.C. 154(b) by 29 days.

(21) Appl. No.: 14/749,563

(22) Filed: Jun. 24, 2015

(65) Prior Publication Data

US 2016/0123472 A1    May 5, 2016

(51) Int. Cl.
| | | |
|---|---|---|
| *B25D 17/00* | (2006.01) | |
| *F16J 15/54* | (2006.01) | |
| *F16J 15/56* | (2006.01) | |
| *F16J 15/3272* | (2016.01) | |
| *E02F 3/96* | (2006.01) | |

(52) U.S. Cl.
CPC ............ *F16J 15/545* (2013.01); *B25D 17/00* (2013.01); *E02F 3/966* (2013.01); *F16J 15/3272* (2013.01); *F16J 15/56* (2013.01); *B25D 2250/065* (2013.01); *B25D 2250/365* (2013.01)

(58) Field of Classification Search
CPC ........ B25D 17/00; F16J 15/32; F16J 15/3268; F16J 15/3272; F16J 15/3276; F16J 15/447
See application file for complete search history.

(56) References Cited

U.S. PATENT DOCUMENTS

| | | | | |
|---|---|---|---|---|
| 2,460,952 | A * | 2/1949 | Simer | F04C 5/00 277/361 |
| 2,711,136 | A * | 6/1955 | Arnold | F16J 15/32 418/154 |
| 3,664,675 | A * | 5/1972 | Malmstrom | F16J 15/3456 277/400 |
| 3,744,805 | A * | 7/1973 | Heinrich | F16J 15/3412 277/400 |
| 5,441,283 | A * | 8/1995 | Pecht | F16J 15/3412 277/400 |
| 6,119,795 | A * | 9/2000 | Lee | B25D 9/00 173/114 |
| 6,510,904 | B1 * | 1/2003 | Tyrrell | B25D 17/08 173/128 |
| 6,685,193 | B2 * | 2/2004 | Roberts | B25C 1/08 277/459 |
| 8,313,104 | B2 * | 11/2012 | Maeda | F16J 15/3208 277/459 |

FOREIGN PATENT DOCUMENTS

FI    EP 2954983 A1 *  12/2015    ............. B25D 17/00

\* cited by examiner

*Primary Examiner* — John Kreck
(74) *Attorney, Agent, or Firm* — Corinne R. Gorski (57) ABSTRACT

A seal of a tool of a breaking hammer, a sealing arrangement, a breaking hammer and a method of sealing a tool of breaking hammer is provided. The seal is a sealing ring having an outer periphery provided with several projecting elements, which are slanted. The projecting elements generate torque in the sealing ring when being pushed in a transverse direction during use of the breaking hammer. Thus, the sealing ring may rotate relative to the tool.

14 Claims, 5 Drawing Sheets

SEAL OF TOOL AND METHOD OF SEALING

RELATED APPLICATION DATA

This application claims priority under 35 U.S.C. §119 to EP Patent Application No. 14171686.0, filed on Jun. 10, 2014, which the entirety thereof is incorporated herein by reference.

TECHNICAL FIELD

The disclosure relates to a seal of a tool of a breaking hammer. The seal is a ring-shaped piece. An inner periphery of the seal serves as a sealing surface against the tool. The disclosure further relates to a sealing arrangement, a breaking hammer and a method of sealing a tool of a breaking hammer.

BACKGROUND

Breaking hammers are used to break hard materials, such as rock, concrete, and the like. The breaking hammer comprises a percussion device for generating impact pulses to a breaking tool connectable to the breaking hammer. The tool is sealed to a body of the breaking hammer or other surrounding structure by means of a tool sealing, which is typically a sealing ring. The current sealing arrangements have shown to contain some disadvantages relating to their wear resistance, for example.

SUMMARY

An aspect of the present disclosure is to provide a novel and improved seal of a tool. A further aspect is to provide a novel and improved sealing arrangement, breaking hammer and method of sealing a tool, which all aim to decrease wearing of a seal of a tool.

The seal according to the present disclosure has an outer periphery of the sealing ring that is provided with several projecting elements, and the projecting elements are slanted relative to normal of the outer periphery when seen in an axial direction of the sealing ring.

The sealing arrangement includes a sealing ring that is allowed to rotate relative to the sealing housing and the tool in the direction of its periphery.

The breaking hammer includes a sealing ring that is allowed to rotate relative to the sealing housing and the tool in the direction of its periphery.

The method according to the disclosure is characterized by using a resilient sealing ring provided with slanted projecting elements on an outer periphery of the sealing ring; allowing the sealing ring to be subjected to forces transverse to longitudinal axis of the tool during use of the breaking hammer; causing the slanted projecting elements of the sealing ring to deform reversibly due to the transverse deflecting forces; recovering the shape of the slanted elements into their initial state after the compression deflecting force is finished and generating a torque in the sealing ring by means of the recovery; and rotating the sealing ring relative to the tool and the sealing housing by the generated torque.

An idea of the disclosed solution is that a sealing ring of a tool is rotated in the direction of its periphery during use of the breaking hammer. Transverse force subjected to the tool and the sealing ring is utilized for producing a needed torque in the sealing ring. The generated torque is based on slanted projecting elements on an outer periphery of the sealing ring. The slanted projecting elements deform reversibly due to the transverse forces and recover after the force is terminated, whereby the torque is generated during the recovery phase.

The life time of the seal may be longer compared to conventional seals, since the sealing ring is turned or rotated during its use. Between the tool and the seal is a sealing surface, which is typically subjected to local or directed wearing. The sealing ring changes position relative to the tool and wearing effect distributes more evenly for the entire sealing surface despite directed transverse forces. Hence, durability of the sealing ring is improved.

Further, when the seal operates properly and prevents impurities from entering inside the structure of the breaking hammer, the operating life of the breaking hammer may be longer. Similarly, the seal prevents lubricating grease from leaking out of the breaking hammer, wherein the life of the tool may be longer. In conclusion, the disclosed solution may allow longer life time for the sealing ring itself and also for the sealed structure, and may further decrease need for service and downtime.

According to an embodiment, the sealing ring rotates relative to the sealing housing and the tool in the direction of its periphery. The tool is subjected to transverse forces during use causing relative movement between the tool and the sealing housing. The relative movement between the tool and the sealing housing in a direction transverse to the longitudinal axis of the tool is configured to cause reversible deformation and recovery of slanting projecting elements on the outer periphery of the sealing ring. The succeeding deformation and recovery generates torque and makes the sealing ring rotate. Thus, between the sealing housing and the sealing ring are several converting elements for converting part of the transverse force directed to the sealing ring into torque of the sealing ring.

According to an embodiment, the slanting projecting elements on the outer periphery of the sealing ring are flexible or compressible, whereby the sealing ring may move inside the sealing housing in the transverse direction due to transverse forces directed to the tool. The projecting elements may serve as dampening elements in addition to serving as torque generating elements. Due to this dampening, the transverse movement of the sealing ring does not cause deformation to a shape of the inner periphery of the sealing ring, whereby roundness of the inner periphery may be maintained. Thus, the dampening aims to maintain the sealing surface unchanged. Furthermore, the dampening may decrease surface pressure between the tool and the inner periphery of the sealing ring because the projecting elements may serve as a flexible or compressible portion in the sealing ring.

According to an embodiment, the sealing housing is provided with a roughening for increasing friction between the sealing ring and the sealing housing. The roughening may be a knurling or grooving, for example. Alternatively, or in addition to, outer surfaces of the projecting elements may have the roughening for the same reason. The increased friction prevents possible slippage between the contacting surfaces and ensures a proper rotation of the sealing ring.

According to an embodiment, the sealing ring is a so called massive sealing ring. Thus, relative dimensions of an axial length L and radial thickness RT have a predetermined range. Also, the maximum outer diameter D and minimum inner diameter d of the sealing ring have a predetermined range. The radial thickness RT may be calculated by formula: $(D-d)/2$. In the massive sealing ring a first ratio $L/RT$ is 0.5 to 2, and further, a second ratio $D/d$ is 1.3 to 3. The massive sealing ring is rigid and durable. The massive sealing ring tolerates well wearing and transverse forces directed to it.

According to an embodiment, the outer periphery of the sealing ring is toothed, including several slanted teeth. Thus, the slanted teeth serve as the slanted projecting elements.

According to an embodiment, the outer periphery of the sealing ring is toothed including several slanted teeth. Furthermore, each tooth of the outer periphery of the sealing ring has flank surfaces, which are slanted relative to normal of the outer periphery when seen in an axial direction of the sealing ring.

According to an embodiment, the outer periphery of the sealing ring is toothed and has several slanted teeth. Furthermore, each tooth of the outer periphery of the sealing ring includes flank surfaces, which are slanted relative to normal of the outer periphery when seen in an axial direction of the sealing ring. Each tooth has a first flank surface, a second flank surface and a tip portion. Further, the first flank surface is curved when seen in axial direction and the second flank surface is planar. The tip portion may be curved.

According to an embodiment, the outer periphery of the sealing ring is toothed with several slanted teeth. Furthermore, each tooth of the outer periphery of the sealing ring includes flank surfaces, which are slanted relative to normal of the outer periphery when seen in an axial direction of the sealing ring. Each tooth has a first flank surface, a second flank surface and a tip portion. Further, the first flank surface and the second flank surface are planar when seen in axial direction. The tip portion may be curved.

According to an embodiment, the projecting elements of the sealing arrangement are bars, pegs, pins, studs or corresponding projecting or protruding elements or shaped pieces. These elements are also slanted as it is described above, wherein the elements are able to generate the needed torque for rotating the sealing ring when influenced by transverse forces. Thus, the disclosed teeth may be substituted with other type of slanted elements, at least in some cases.

According to an embodiment, the seal is made of one or more resilient materials. The resilient material may be temporarily compressed or reshaped and may recover its initial shape after a deflecting force terminates.

According to an embodiment, the sealing ring is made of resilient rubber or rubber-like material.

According to an embodiment, the sealing ring is made of resilient polymer, such as polyurethane PU. Some other elastic polymer materials may also be used.

According to an embodiment, the sealing ring is made of resilient material provided with suitable internal damping. The slanted projecting elements of the sealing ring may bend when the sealing ring is subjected to a transverse deflecting force, and may return to the original shape after the deflecting force has been terminated.

According to an embodiment, the sealing ring is provided with several predetermined articulation points, which allow an outer form of the sealing ring to be modified for the duration of mounting of the sealing ring. Due to the articulation points, the sealing ring may be a single uniform piece, and despite of that, the sealing ring may be easily mounted in place to a sealing housing. The articulation points allow the structure of the sealing ring to be bent more intensively as compared to basic structure of the sealing ring, and further, less force is needed. The articulation system is especially preferred for a massive sealing ring, which is relatively rigid and mounting of which is difficult. Number of the articulation points may be two, three, four, or even more.

According to an embodiment, the sealing ring is provided with several slits, which serve as articulation points and allow an outer shape of the sealing ring to be temporarily modified. Thus, the sealing ring includes at least two outer slits on the outer periphery and at least one inner slit on the inner periphery. The slits have limited radial dimensions without extending to the opposing periphery of the sealing ring, and without shearing the sealing ring into parts. The sealing ring is a single uniform piece despite of the slits. Further, the at least two outer slits define a mounting sector area between them. At the mounting sector area is located the one or more inner slit. The outer and inner slits allow the mounting sector area to be pushed inwards during mounting in order to decrease outer dimensions of the seal ring for the duration of the mounting of the sealing ring. After the sealing ring is placed in the amended shape into a correct position inside the sealing housing, the deflecting mounting force is removed and the sealing ring takes its original shape and outer dimensions.

According to an embodiment, the sealing ring is provided with two outer slits on the outer periphery and one inner slit on the inner periphery. The outer slits define the mounting sector area having a sector angle 100-120°. The inner slit is located in a middle of the mounting sector area. The sealing ring may be set to a mounting state for the duration of the mounting by pushing the mounting sector area inwards. The slits serve as articulation point and allow the sealing ring to amend its outer shape so that the sealing ring may resembles small letter omega symbol (ω). When the deflecting force directed to the mounting area is terminated, the sealing ring may take its initial shape and outer dimensions.

According to an embodiment, the sealing ring is provided with several slits, which serve as articulation points. The slits may end up to axial drillings or to corresponding crack preventing end spaces. Thanks to this embodiment durability of the sealing ring is improved since formation of cracks may be avoided.

According to an embodiment, the sealing ring and the sealing housing both have a uniform or unbroken structure. When the sealing ring is provided with the articulation points, such as the slits, then it can be mounted to its place as a uniform single piece. There is no need to form the sealing housing of two halves, whereby the structure of the sealing housing may be more rigid. The sealing housing is located at a lower end of the breaking hammer and is thereby subjected to blows and forces. The uniform sealing housing better withstands the harsh environment. Moreover, the uniform structure improves the rotation of the sealing ring as compared to a sealing ring made of two halves. It has been noted in experiments that when the sealing ring is cut to separate pieces, the end faces of the pieces resist the rotation and no desired effect is achieved.

According to an embodiment, the breaking hammer includes a protective casing surrounding the percussion device. The protective casing may protect the percussion device against impurities and dents. Further, the protective casing may dampen noise of the percussion device. A lower end of the protective casing is provided with a tool aperture through which the tool is arranged to pass. Thus, the sealing housing and the sealing ring are located at the tool aperture of the protective casing.

According to an embodiment, the percussion device includes a frame and the sealing housing and the sealing ring are located at tool side end of the frame. Thus, the breaking hammer is without a protective casing surrounding the percussion device.

According to an embodiment, the breaking hammer includes a separate sealing frame piece mounted to a tool side end of the breaking hammer. The sealing frame piece is provided with the sealing housing and the sealing ring. The sealing frame piece may be mounted to a lower end of a protective casing surrounding a percussion device. Alternatively, the sealing frame piece may be mounted to a lower end of a frame of the percussion device if the percussion hammer is without any protective casing. The separate sealing frame piece may be a component, which is easy to mount and dismount.

It should be appreciated that the sealing of the tool of the breaking hammer is also suitable for other types of breaking hammers than those disclosed herein. The percussion or impact device may differ from the one shown, for example.

The above-disclosed embodiments can be combined to form desired solutions provided with necessary features disclosed.

BRIEF DESCRIPTION OF THE FIGURES

Some embodiments are described in more detail in the accompanying drawings, in which.

For the sake of clarity, the Figures show some embodiments of the disclosed solution in a simplified manner. In the Figures, like reference numerals identify like elements.

DETAILED DESCRIPTION

Figure 1:
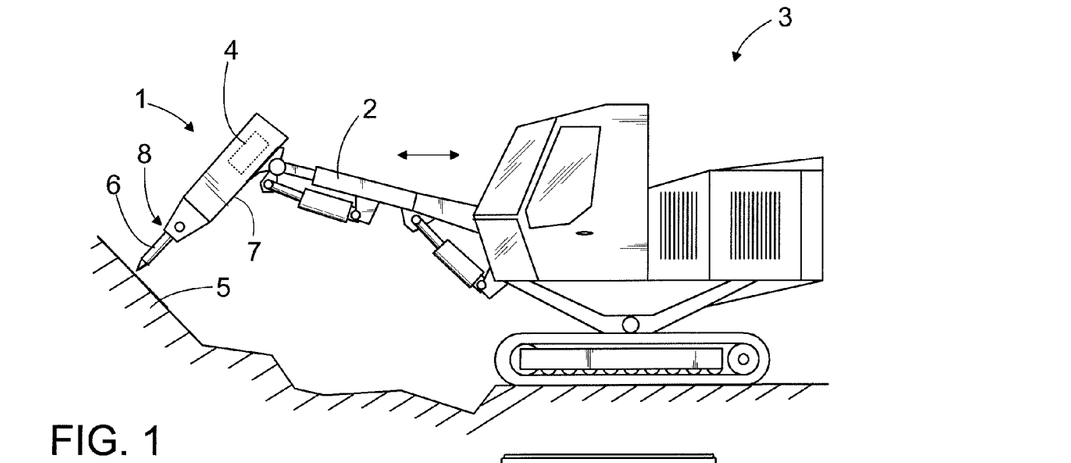
FIG. 1 is a schematic side view of an excavator, which is provided with a breaking hammer.

FIG. 1 shows a breaking hammer 1 arranged on the free end of a boom 2 in a working machine 3, such as an excavator. Alternatively, the boom 2 may be arranged on any movable carriage or on a fixed platform of a crushing apparatus. The breaking hammer 1 includes a percussion device 4 for generating impact pulses. The breaking hammer 1 may be pressed by the boom 2 against material 5 to be broken and impacts may be simultaneously generated with the percussion device 4 to a tool 6 connected to the breaking hammer 1, which transmits the impact pulses to the material 5 to be broken. The percussion device 4 may be hydraulic, whereby it is connected to the hydraulic system of the working machine 2. Alternatively, the percussion device 4 may be electrically or pneumatically powered. The impact pulses may be generated in the percussion device 4 by a percussion element, such as percussion piston, that may be moved back and forth in the impact direction and return direction under the influence of hydraulic fluid.

Further, the breaking hammer 1 may include a protective casing 7, inside which the percussion device 4 may be located. At a lower end of the breaking hammer, i.e. at the tool side end, is a sealing arrangement 8 for sealing the tool 6 to the surrounding structures of the breaking hammer. The sealing arrangement 8 includes a sealing ring as disclosed herein.

Figure 2:
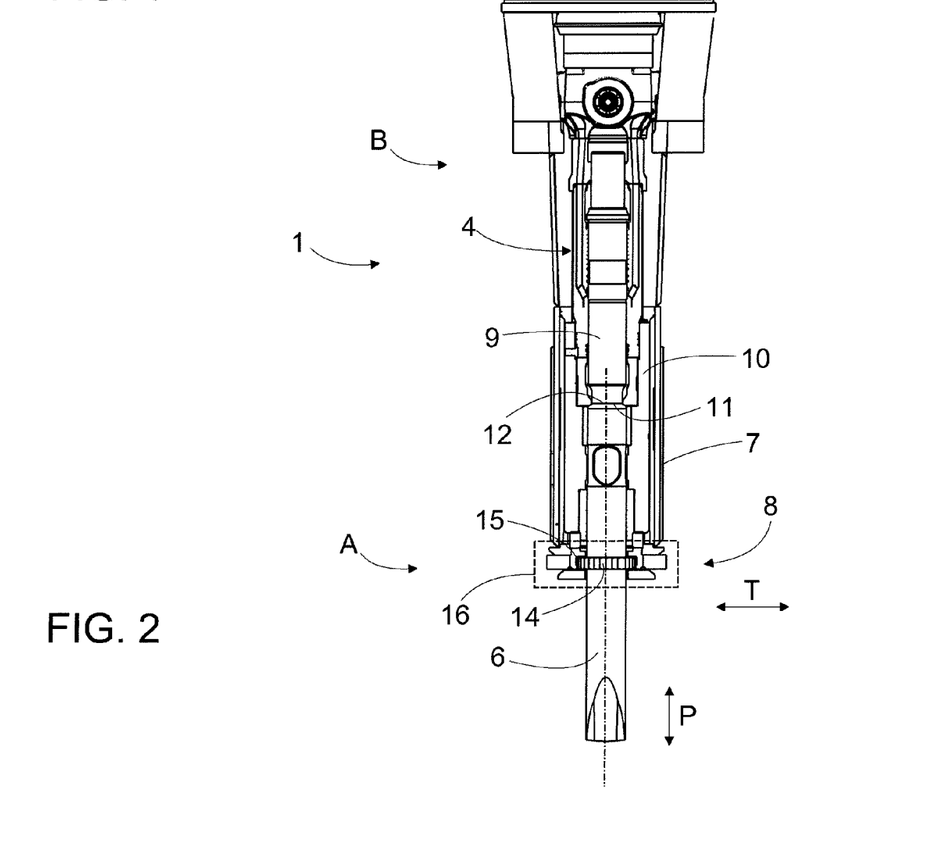
FIG. 2 is a schematic and sectional side view of a breaking hammer.

FIG. 2 discloses a structure of a breaking hammer 1. The breaking hammer has a lower end A at a tool side end and an upper end B provided with mounting means for connecting the breaking hammer 1 to a boom. Inside protective casing 7 is percussion device 4, which may have a percussion piston 9 arranged to move to and fro relative to a frame 10 of the percussion device 4. An impact surface 11 of the percussion piston 9 is arranged to strike an upper end 12 of a tool 6. The tool 6 may be connected to the breaking hammer 1 by a transverse connecting pin. The tool 6 is allowed to move in the axial direction P during the use.

At the lower end of the breaking hammer 1 is a sealing arrangement 8 having a sealing ring 14 through which the tool 6 passes. The sealing ring 14 is arranged in a sealing housing 15, which surrounds the tool 6. The sealing housing 15 may be formed to the lower end of the protective casing 7.

As discussed above, the sealing housing may alternatively be part of the frame 10 of the percussion device if no protective casing exists. A further possibility is that at the lower end of the protective casing 7 is mounted a separate sealing assembly 16, which is illustrated by broken lines in FIG. 2.

During the use of the breaking hammer 1, the tool 6 is subjected to forces in a transverse direction T in addition to operational forces directed in the axial direction P. These transverse forces make the tool 6 to move in the transverse direction T. The sealing ring 14 needs to withstand this transverse movement and keep the sealing tight. In the present solution, the transverse forces and movements are utilized for generating a torque in the sealing ring 14 for making it rotate relative to the tool 6. If the tool 6 is moved repeatedly in one or few transverse directions, then the sealing ring 14 is subjected to local wearing in accordance with the transverse movements. This is a typical situation with breaking hammers. However, due to the rotating sealing ring 14, the relative position between the tool 6 and a sealing surface of the sealing ring 14 may be constantly altered, wherefore wearing of the sealing surface is more evenly distributed.

Figure 3:
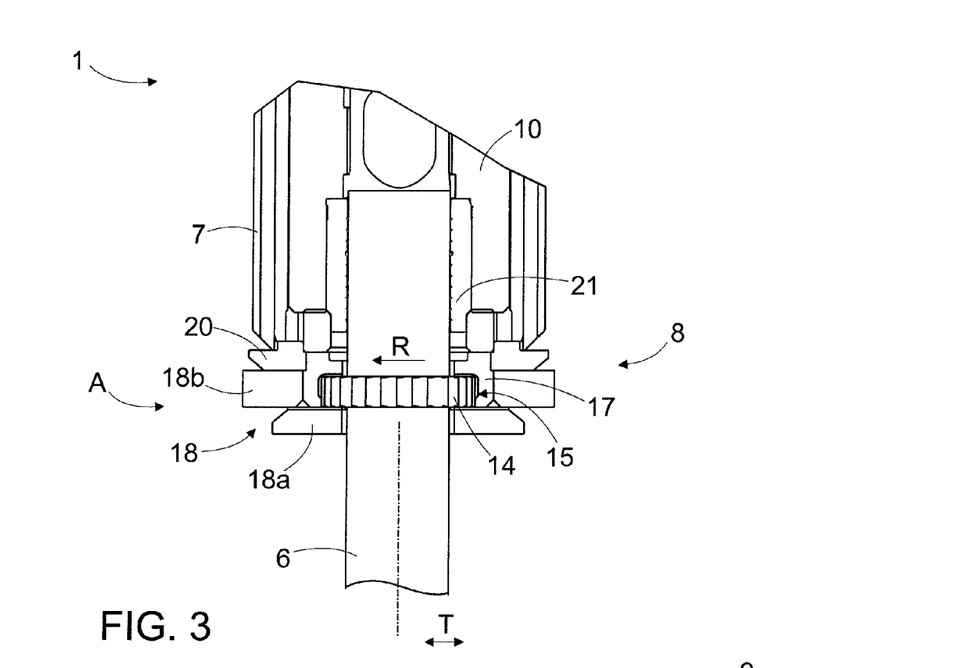
FIG. 3 is a schematic and sectional side view of a lower end portion of a breaking hammer provided with a rotating sleeve ring.
Figure 4:
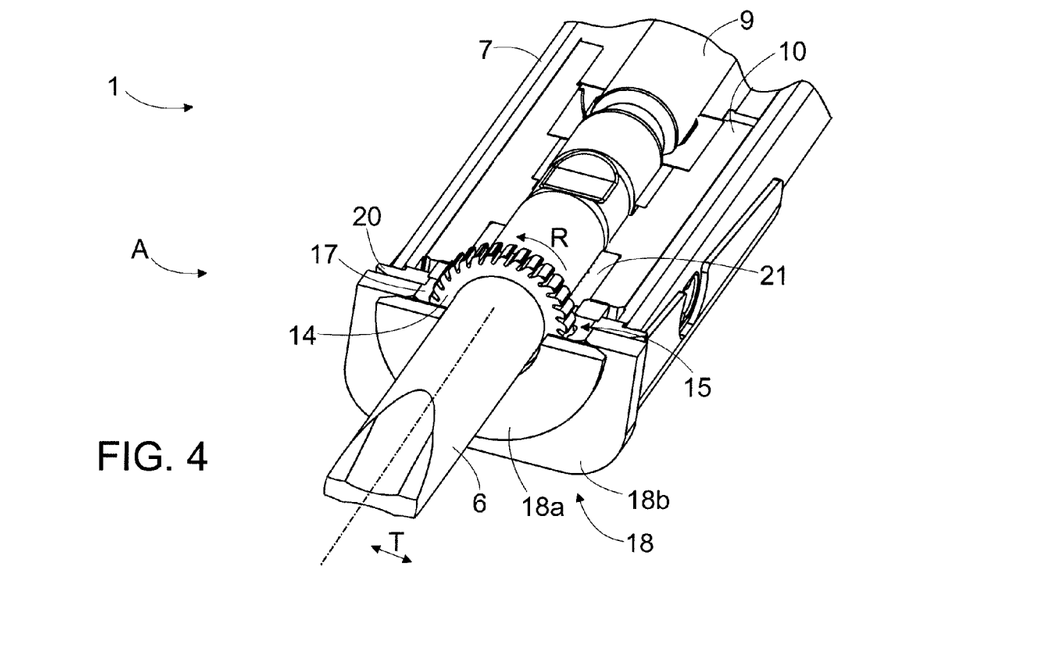
FIG. 4 is a perspective view of the braking hammer of FIG. 3.

FIGS. 3 and 4 show in a more detailed manner the sealing housing 15 and the sealing ring 14. The sealing housing 15 may be formed as a sleeve-like piece 17, which may be supported to a lower end A of the protecting cover 7 by a bottom plate 18. A first bottom plate component 18a may support the sealing ring 14 axially. Around the piece 17 may be a second bottom plate component 18b, which may serve as a protective element around the sealing housing 15. The bottom plate components 18a, 18b may be fastened fixedly together. Further, a mounting sleeve 20 may be fastened to the lower end of the protective casing 7 and may provide support for the sleeve like pieces 17 and 18.

When assembling the sealing ring 14 into the sealing housing 15, the tool 6 is first removed and thereafter the sealing ring 14 may be pressed into a smaller outer dimension in order to allow it to be pushed inside the sealing housing 15. Thereafter, the tool 6 is pushed through the sealing ring 14 into its designed place and is locked by one or more locking pins. Thus, in the disclosed solution only the tool 6 needs to be dismounted when the sealing ring 14 is changed. The sealing ring 14 prevents impurities from entering inside the structure of the breaking hammer 1. Further, the sealing ring has a second purpose, namely to prevent lubricating grease or corresponding lubricant to escape from a lubricating space 21. The tool 6 may have a limited movement in a transverse direction T during the operation. As disclosed above, the transverse movement is converted into rotation R of the sealing ring 14.

Figure 5:
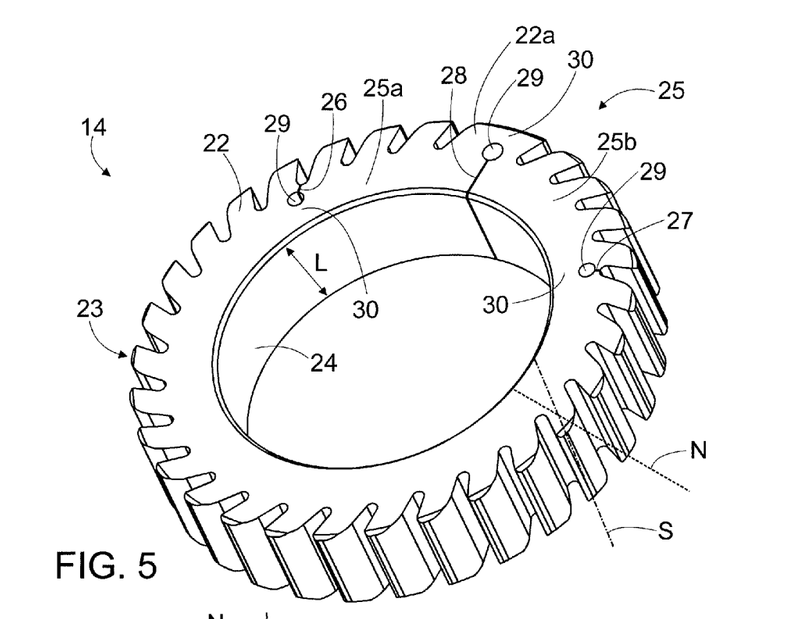
FIG. 5 is a schematic perspective view of a sealing ring provided with teeth on its outer periphery.

FIG. 5 shows a sealing ring 14, which is provided with teeth 22 on its outer periphery 23. The teeth 22 serve as the above-mentioned slanting projecting elements, which may convert the transverse movement of the sealing ring 14 into torque for generating rotation. The teeth 22 are slanted S relative to normal N of the outer periphery 23, as it is demonstrated in FIG. 5. The teeth 22 are slanted only when seen in axial direction of the sealing ring 14. An inner periphery 24 of the sealing ring 14 serves as a sealing surface against the tool.

The sealing ring 14 may include a mounting sector 25 for facilitating mounting of the sealing ring 14 as one uniform piece into a sealing housing. The mounting sector 25 area is defined by at least two outer slits 26 and 27 on the outer periphery 23. Further, at least one inner slit 28 is located on the inner periphery 24. The slits 26-28 have limited radial dimensions without extending to the opposing periphery of the sealing ring 14, and without shearing the sealing ring 14 into parts. The outer slits 26, 27 and the inner slit 28 allow the mounting sector area 25 to be pushed inwards during mounting in order to decrease outer dimensions of the seal ring 14 for the duration of the mounting. The slits 26-28 may end up to axial drillings or to corresponding end spaces 29, which may prevent cracking. At the inner slit 28 two adjacent teeth may form a combined tooth 22a so that the slit 28 and end space 29 may be positioned appropriately. The slits 26, 27 and 28 define articulation points 30, which allow mounting sector components 25a and 25b of the sealing ring 14 to be bent inwards. Mounting of the sealing ring 14 is disclosed more detailed in FIGS. 7, 9 and 10.

Figures 6A, 6B:
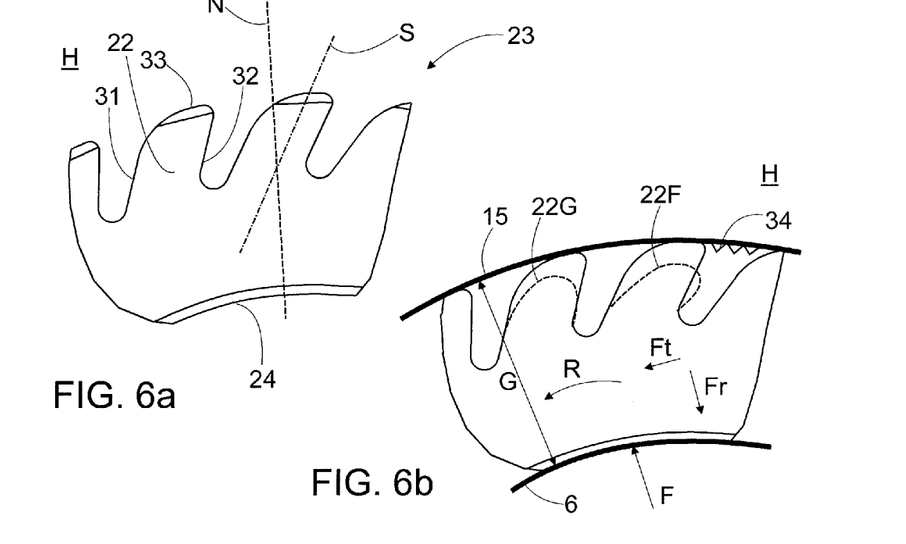
FIG. 6a is a schematic axial view of a detail H showing some teeth in their initial state.
FIG. 6b illustrates the situation when the sealing ring is subjected to transverse movement.
Figure 7:
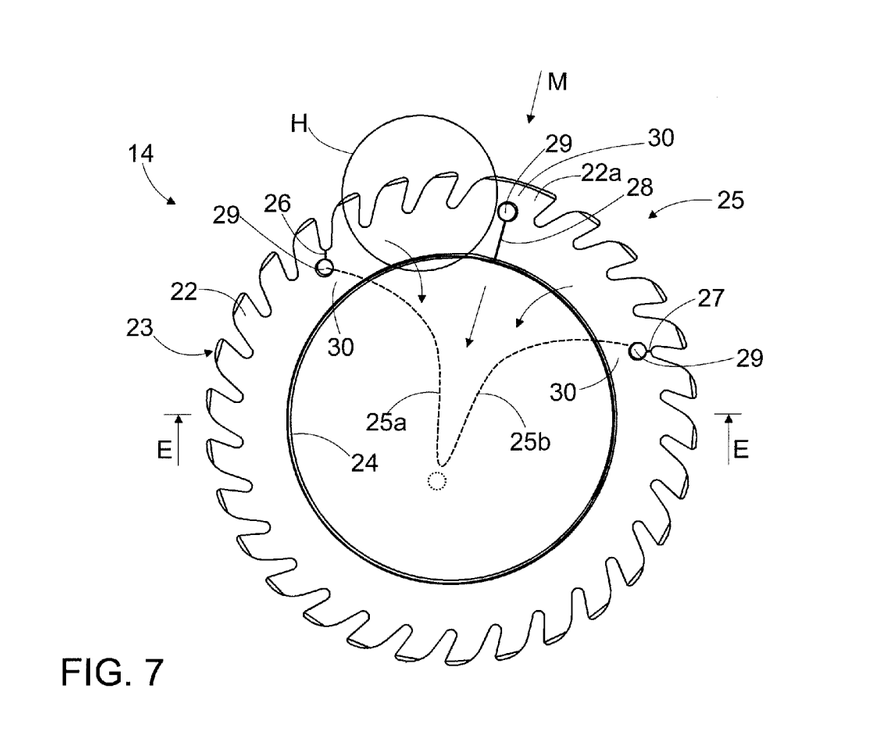
FIG. 7 is a schematic axial view of a sealing ring.

FIG. 6a is a detail H of FIG. 7 showing some teeth 22 in their initial state, and FIG. 6b illustrates the situation when the sealing ring 14 is subjected to transverse movement caused by a force F.

The outer periphery 23 of the sealing ring 14 is toothed and includes several teeth 22, which are slanted. Slanting direction S is shown in FIG. 6a as well as normal N of the outer periphery 23. Each tooth 22 has flank surfaces 31, 32, which are slanted relative to normal N when seen in an axial direction of the sealing ring 14. Each tooth 22 has a first flank surface 31, a second flank surface 32 and a tip portion 33. The first flank surface 31 may be curved when seen in axial direction and the second flank surface 32 may be planar. Alternatively, the first flank surface 31 may also be planar surface and the second flank surface 32 may also be curved. The tip portion 33 may be curved.

In FIG. 6b the sealing ring 14 is pushed towards the sealing housing 15. It is illustrated in FIG. 6b that a tooth 22G is compressed when a gap G between the tool 6 and the sealing housing 15 is decreased. Alternatively, or in addition to, the teeth may be bend and deform reversible, as a tooth 22F illustrates. When the deforming force F terminates and the gab G is extended, the deformed teeth 22G and 22F reverse into their initial shape. Then tangential force component Ft is generated in addition to radial force component Fr. The tangential force component Ft generates torque and makes the sealing ring 14 to rotate R. Hence, the slanting elements, such as teeth 22, on the outer periphery 23 act as converting elements or spring elements for converting the transverse force F into torque, which is configured to generate a rotating movement of the sealing ring 14 in the direction of its periphery.

Further, FIG. 6b discloses in a highly simplified manner that an inner surface of the sealing housing, which faces the sealing ring 14, may be provided with a roughening 34 for preventing slippage and improving the rotation R of the sealing ring 14 when the generated torque exists.

In FIG. 7 the sealing ring is seen in axial direction. The main features of the sealing ring 14 are disclosed already above. The sealing ring is a single uniform piece. In order to facilitate its mounting, the sealing ring 14 is provided with slits 26-28 for producing a mounting sector 25 area. In FIG. 7 it is illustrated that a mounting force M may be directed to sealing ring 14 for pushing the mounting sector area 25 inwards. Then mounting sector components 25a and 25b may bend relative to each other and relative to the rest of the sealing ring structure. Thus, outer dimension of the sealing ring 14 may be decreased for the duration of the mounting. Since the sealing ring is made of resilient material, the initial shape will recover after the mounting force M is terminated.

It is also possible that the disclosed sealing ring provided with the slanting projecting elements may in some cases be without the disclosed slits. The sealing housing may be formed of halves, for example.

Figure 8:
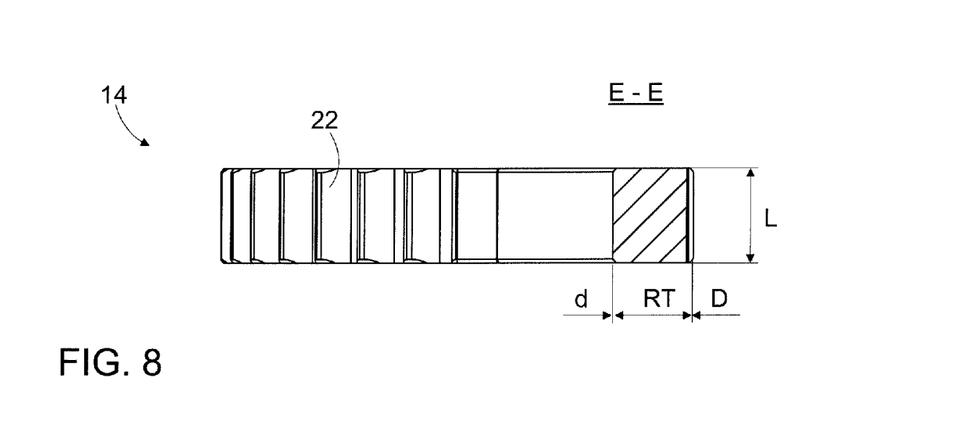
FIG. 8 is a schematic and partly sectional side view of the sealing ring shown in FIG. 7.

FIG. 8 shows that the teeth 22 or corresponding projecting elements are not slanted in the axial direction. FIG. 8 also presents dimensions length L, radial thickness RD, inner diameter d and outer diameter D. The sealing ring 14 may be a so called massive seal the relative dimension of which are defined above.

An alternative solution to the above comprises a separate support piece surrounding the sealing ring and causing torque for rotating the sealing ring. The separate resilient support piece provided with an aperture is arranged in the sealing housing. The aperture is provided with the slanted elements. Thus, an inner surface of the aperture of the support piece may comprise slanted teeth, for example. In this alternative embodiment an outer periphery of the sealing ring may be smooth and may be arranged against the slanted elements of the aperture of the support piece. The slanted elements of the support piece may cause a rotation for the sealing ring when the tool and the sealing ring are moved in a transverse direction. Thus, the sealing ring is not provided with the slanting elements for producing the torque, but the slanting elements are on the inner periphery of the separate support piece. The support piece may be made of resilient material. The support piece may be fastened immovably to a sealing housing.

The principle of generating the rotation is the same as disclosed above. This kind of sealing arrangement may be defined as follows: A sealing arrangement including a tool, which is an elongated piece; a support piece, which is located around the tool and includes an aperture; an annular gap between an outer surface of the tool and an inner surface of the aperture of the support piece; a sealing ring arranged to the annular gap for sealing the tool; the inner surface of the aperture of the support piece having several projecting elements, which are slanted when seen in an axial direction of the tool; the support piece being of resilient material; and wherein transverse movement of the tool and the sealing ring are configured to produce a torque for causing the sealing ring to rotate relative to the tool. According to a first embodiment the inner surface of the aperture of the support piece is toothed and the teeth are slanted. Further, in this solution the sealing ring may be made of resilient material, or alternatively it may be of suitable other material, such as bronze. Thus, the sealing ring may be of non-resilient material too.

Figure 9:
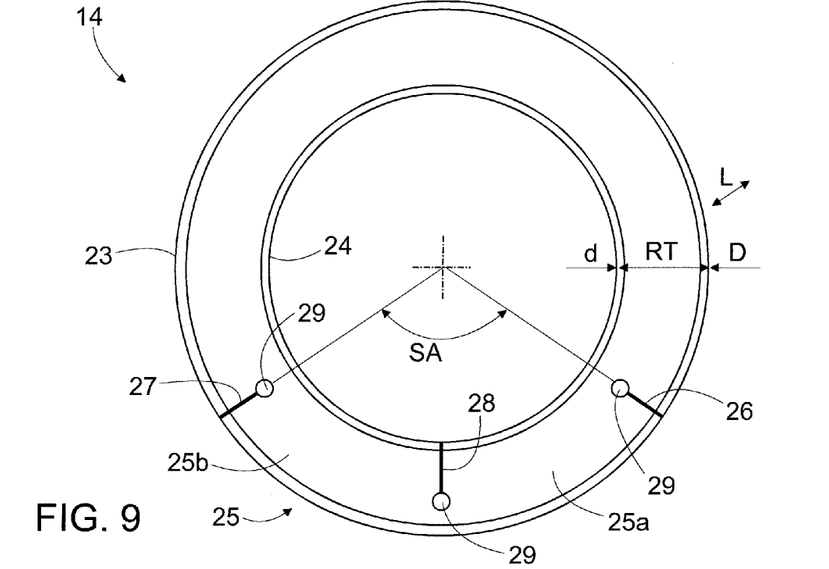
FIGS. 9 and 10 are schematic axial views of an alternative sealing ring.
Figure 10:
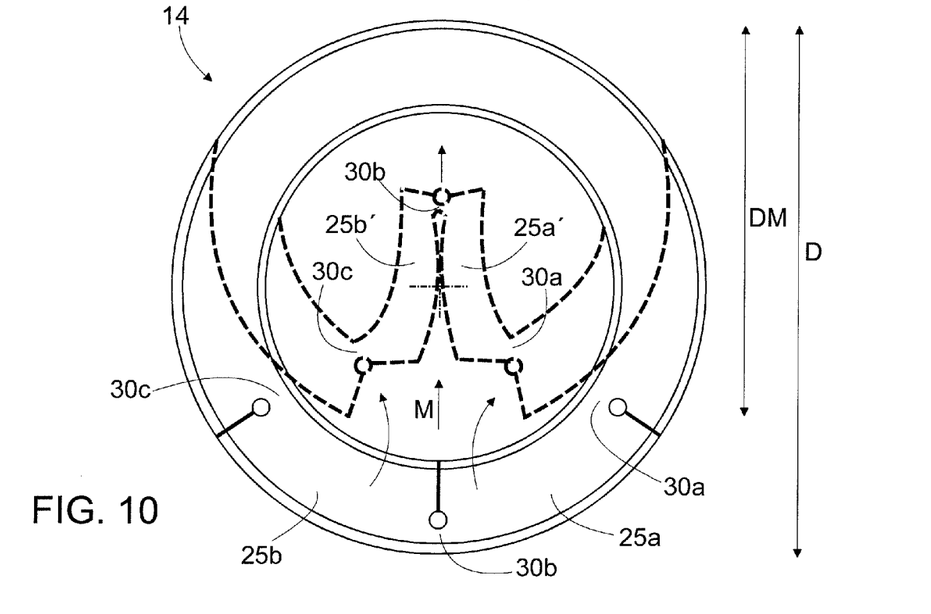

Further, an alternative solution, is also disclosed in FIGS. 9 and 10. A sealing ring 14 for sealing a tool of a breaking hammer may be without the above disclosed rotation feature. However, it may include several other features disclosed supra. The sealing ring 14 may be provided with the above disclosed slits for facilitating the mounting of the sealing ring. However, the outer periphery of the sealing ring may be without the disclosed slanted protruding elements, such as teeth, since the sealing arrangement may be without the disclosed feature relating to rotation of the sealing ring relative to the tool and the sealing housing. Hence, the outer periphery of the sealing ring may be smooth.

This kind of seal may be defined as follows: A seal of a tool of a percussion breaking hammer, wherein the seal is a ring-shaped piece having an inner periphery, an outer periphery and an axial length; the inner periphery is serving as a sealing surface and is intended to be arranged against the tool to be sealed; the outer periphery is intended to be facing a sealing housing; and the sealing ring is made of resilient material; and wherein the sealing ring comprises at least two outer slits on the outer periphery and at least one inner slit on the inner periphery; the slits have limited radial dimensions without extending to the opposing periphery of the sealing ring, and without shearing the sealing ring into parts; the at least two outer slits define a mounting sector area between them; the at least one inner slit is located at the mounting sector area; and wherein the outer and inner slits allow the mounting sector area to be pushed inwards during mounting in order to decrease outer dimensions of the sealing ring for the duration of the mounting. The initial outer diameter D may be reversibly deformed to a smaller mounting diameter DM.

A first embodiment of the seal may have additional features as follows: the sealing ring is provided with two outer slits 26, 27 on the outer periphery 23 and one inner slit 28 on the inner periphery 24; the mounting sector area 25 defined by the outer slits has a sector angle SA 100-120°; the at least one inner slit 28 is located in a middle of the mounting sector area 25; and the sealing ring 14 resembles small letter omega symbol w when set to a mounting state by pushing the mounting sector area inwards for the mounting of the sealing ring 14.

A second embodiment of the sealing ring 14 may have an additional feature as follows: the slits 26-28 may end up to axial drillings or to corresponding crack preventing end spaces 29.

A third embodiment of the sealing ring may include the additional features as follows: the sealing ring 14 and the sealing housing 15 both have uniform or unbroken structure.

According to a fourth embodiment the sealing ring is a massive sealing ring as defined above. Furthermore, the sealing ring may be made of the above mentioned materials and it may be utilized in the above mentioned arrangement and breaking hammer. Hence, it is possible that the only difference between the solution disclosed in FIGS. 9 and 10 relative to other solutions, disclosed in FIGS. 1 to 8, is that no slanted elements are on the outer periphery.

The features shown in FIGS. 5 to 10 relating to the facilitated mounting of the uniform sealing ring may be utilized in all embodiments despite the fact that all the features may not be explained in a detailed manner in the specification of each and every Figure.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A seal of a tool of a breaking hammer, wherein the seal is a sealing ring comprising:
   an inner periphery and an axial length, the inner periphery being a sealing surface to be arranged against the tool to be sealed;
   an outer periphery facing a sealing housing, the sealing ring being made of a resilient material; and
   a plurality of projecting elements located on the outer periphery, the projecting elements being a plurality of teeth slanted relative to normal of the outer periphery when seen in an axial direction of the sealing ring.

2. The seal as claimed in claim 1, wherein each tooth of the outer periphery of the sealing ring includes flank surfaces, which are slanted relative to normal of the outer periphery when seen in an axial direction of the sealing ring.

3. The seal as claimed in claim 2, wherein each tooth has a first flank surface, a second flank surface and a tip portion, wherein the first flank surface is curved when seen in an axial direction, the second flank surface being planar and the tip portion being curved.

4. The seal as claimed in claim 1, wherein the sealing ring includes at least two outer slits on the outer periphery and at least one inner slit on the inner periphery, the slits having limited radial dimensions without extending to the opposing periphery of the sealing ring, and without shearing the sealing ring into parts, the at least two outer slits defining a mounting sector area therebetween, the at least one inner slit being located at the mounting sector area, and wherein the outer and inner slits allow the mounting sector area to be pushed inwards during mounting in order to decrease outer dimensions of the sealing ring for the duration of the mounting.

5. The seal as claimed in claim 4, wherein the sealing ring is provided with two outer slits on the outer periphery and one inner slit on the inner periphery, the mounting sector area defined by the outer slits having a sector angle of 100-120°, the inner slit being located in a middle of the mounting sector area, and wherein the sealing ring is shaped like a small letter omega symbol (w) when set to a mounting state by pushing the mounting sector area inwards for the mounting of the sealing ring.

6. A sealing arrangement comprising:
   a tool, which is an elongated piece;
   a sealing housing located around the tool;
   an annular gap between an outer surface of the tool and an inner surface of the sealing housing; and
   a sealing ring made of a resilient material and arranged to seal the gap, the sealing ring including an inner periphery, an outer periphery facing a sealing housing, and an axial length, the inner periphery being a sealing surface to be arranged against the tool to be sealed, and a plurality of projecting elements located on the outer periphery, the projecting elements being slanted relative to normal of the outer periphery when seen in an axial direction of the sealing ring, wherein the sealing ring is allowed to rotate relative to the sealing housing and the tool in the direction of its periphery.

7. The seal arrangement as claimed in claim 6, wherein relative movement between the tool and the sealing housing in a direction transverse to the longitudinal axis of the tool is configured to cause reversible deformation and recovery of slanting projecting elements on the outer periphery of the sealing ring and to generate rotation of the sealing ring.

8. The seal arrangement as claimed in claim 6, wherein at least the sealing housing is provided with a roughening for increasing friction between the sealing ring and the sealing housing.

9. A breaking hammer, comprising:
a percussion device;
a tool connectable to the percussion device;
a sealing housing located around the tool; and
a sealing ring made of a resilient material located in the sealing housing, wherein the sealing ring has an aperture through which the tool passes, whereby the sealing ring is configured to seal a gap between the tool and the sealing housing, the sealing ring including an inner periphery, an outer periphery facing a sealing housing, and an axial length, the inner periphery being a sealing surface to be arranged against the tool to be sealed, and a plurality of projecting elements located on the outer periphery, the projecting elements being slanted relative to normal of the outer periphery when seen in an axial direction of the sealing ring, wherein the sealing ring is allowed to rotate relative to the sealing housing and the tool in the direction of its periphery.

10. The breaking hammer as disclosed in claim 9, further comprising a protective casing surrounding the percussion device, the protective casing being provided with a tool aperture through which the tool is arranged to pass, wherein the sealing housing and the sealing ring are located at the tool aperture of the protective casing.

11. The breaking hammer as disclosed in claim 9, wherein the percussion device includes a frame, the sealing housing and the sealing ring being located at a tool side end of the frame.

12. The breaking hammer as disclosed in claim 9, further comprising a separate sealing frame piece mounted to a tool side end of the breaking hammer, the sealing frame piece being provided with the sealing housing and the sealing ring.

13. A method of sealing a tool of a breaking hammer, the method comprising:
providing the breaking hammer with at least one sealing ring;
arranging the sealing ring in a sealing housing of the breaking hammer;
passing the tool through an aperture of the sealing ring;
using a resilient sealing ring provided with slanted projecting elements on an outer periphery of the sealing ring;
allowing the sealing ring to be subjected to forces transverse to a longitudinal axis of the tool during use of the breaking hammer;
causing the slanted projecting elements of the sealing ring to deform reversibly due to the transverse deflecting forces;
recovering the shape of the slanted elements into their initial state after the deflecting force is finished and generating a torque in the sealing ring by means of the recovery; and
rotating the sealing ring relative to the tool and the sealing housing by means of the generated torque.

14. The method according to claim 13, further comprising generating the torque for the rotation of the sealing ring by means of slanted teeth on the outer periphery of the sealing ring.

\* \* \* \* \*